United States Patent [19]
Morris et al.

[11] Patent Number: 5,269,840
[45] Date of Patent: Dec. 14, 1993

[54] SOL BONDED COLORANT CLUSTERS AND PROCESS FOR MAKING

[75] Inventors: Geoffrey P. Morris, White Beak Lake; Chester A. Bacon, Jr., Oakdale; Wallace K. Bingham, North St. Paul, all of Minn.

[73] Assignee: Minnesota Mining and Manufacturing Company, St. Paul, Minn.

[21] Appl. No.: 830,622

[22] Filed: Feb. 4, 1992

[51] Int. Cl.$^5$ ................................................ C09C 3/06
[52] U.S. Cl. ........................................ 106/437; 106/400; 106/401; 106/410; 106/431; 106/434; 106/435; 106/438; 106/446; 106/450; 106/453; 106/454; 106/457; 106/459; 106/475; 106/481; 106/485; 106/493; 106/495; 106/497
[58] Field of Search ............... 106/410, 437, 438, 446, 106/431, 434, 435, 450, 453, 454, 457, 459, 475, 481, 485, 493, 495, 497, 400, 401

[56] References Cited

U.S. PATENT DOCUMENTS

| | | | |
|---|---|---|---|
| 2,574,971 | 11/1951 | Heltzer | 106/228 |
| 3,251,704 | 5/1966 | Nellessen | 106/415 |
| 3,445,310 | 5/1969 | Danielson et al. | 156/230 |
| 3,856,545 | 12/1974 | Ferrigno | 106/467 |
| 3,899,346 | 8/1975 | Ferrigno | 106/414 |
| 4,178,341 | 12/1979 | Caswell | 23/313 AS |

FOREIGN PATENT DOCUMENTS

| | | |
|---|---|---|
| 1519226 | 3/1970 | Fed. Rep. of Germany . |
| 948258 | 1/1964 | United Kingdom . |

OTHER PUBLICATIONS

Patent Abstracts of Japan, vol. 6, No. 31 (C-92), Feb. 24, 1982, and JP A 56 149 464, Nov. 19, 1981.
Database WPI, Section Ch, Week 7819, Derwent Publications Ltd., London, GB; Class E31, AN 78-3437A, and JP A 53 034 827, Mar. 31, 1978.
Nalco Chemical Company—Product Bulletin K-1115, 1989.
Ralph K. Iler, *The Chemistry of Silica, Solubility, Polymerization, Colloid and Surface Properties, and Biochemistry*, John Wylie & Sons, New York, 1979, pp. 415–419.
S. Lowell and Joan E. Shields, *Powder Surface Area and Porosity*, 2nd ed., Chapman and Hall, New York, 1984, pp. 3–35 and 158–182.

Primary Examiner—Mark L. Bell
Assistant Examiner—Scott L. Hertzog
Attorney, Agent, or Firm—Gary L. Griswold; Walter N. Kirn; Robert H. Jordan

[57] ABSTRACT

Colorant clusters comprising an aggregation of a plurality of grains of sol-derived material and colorant. The clusters are particularly useful as pigments in liquid compositions, e.g., paints and inks, for forming coatings that are retroreflective immediately upon drying. Also, a process for preparing such colorant clusters comprising admixing colorant in a binder sol to yield a pigment sol and then removing liquid medium from the pigment sol to yield the clusters. Also, a coating composition comprising retroreflective elements, a vehicle, and the aforementioned colorant clusters. After application of the composition to a substrate, the resultant coating is immediately retroreflective upon drying.

40 Claims, 1 Drawing Sheet

SOL BONDED COLORANT CLUSTERS AND PROCESS FOR MAKING

FIELD OF INVENTION

The present invention relates to colorant clusters, e.g., of pigments or dyes, which are especially suited for use in retroreflective paints and inks. It also relates to coating compositions containing such clusters, and methods for making such clusters.

BACKGROUND

Retroreflection is a phenomena in which incident light is returned substantially back toward its source. This phenomena is extremely useful for providing signage and pavement markings which remain conspicuous at night with only vehicular illumination. Retroreflection is a cost efficient alternative to electrically operated signs and markings in many locations. Retroreflective signage (e.g., traffic signs, architectural locations, etc.) and pavement markings may be provided by installation of well known factory-prepared sheets and strips or, alternatively, by on-site application of paint-like liquids. Retroreflective signage and pavement markings are used in a variety of colors, depending in part upon the application. For instance, lane markings on pavement are typically yellow and/or white.

One early technique for imparting retroreflective effect to surfaces entailed application of a paint-like liquid to a roadway surface followed by sprinkling of glass beads or microspheres onto the wet liquid. The microspheres become partially embedded in the tacky liquid and served as retroreflective elements when the paint subsequently dried. U.S. Pat. No. 2,574,97 (Heltzer) discloses premixing of glass microspheres in a paint-like liquid prior to application to a roadway surface. One shortcoming of the resultant coatings is that the microspheres remain fully embedded in the resultant coating during and after drying. For this reason the coating is not immediately retroreflective, and becomes retroreflective only after traffic wears away some of the solidified paint so as to expose the front surfaces of the microspheres, thereby allowing them to function as retroreflective elements.

U.S. Pat. No. 3,251,704 (Nellessen) discloses a premixed retroreflective paint which is retroreflective immediately upon drying. The retroreflective paints disclosed therein employ spheroidal clusters of powdered pigment particles held together by a transparent binder. After application of the composition to a substrate, the coating dries and the clusters slide off the tops or front surfaces of the microspheres. Due to this advantageous property, the premixed microspheres at the surface are left unobscured by pigment, immediately able to function as retroreflective elements. It should be noted that typically a thin layer of binder resin, preferably substantially transparent, remains over the front surfaces of the microspheres, conforming to the surface thereof.

Although the premixed retroreflective paints disclosed in U.S. Pat. No. 3,251,704 offer the desirable qualities of single step application and immediate retroreflectivity upon drying, they are plagued by relatively high costs. The high cost is due in part to relatively complex and costly procedures of acid neutralization and firing at raised temperatures (see column 4, line 73, through column 5, line 3) required to produce a weatherproof embodiment of the clusters of pigment powder disclosed therein. Accordingly, it is desirable to either develop a less expensive colorant cluster possessing the capability of sliding off the front surfaces of microspheres as disclosed in U.S. Pat. No. 3,251,704 or, in the alternative, develop a less expensive process for production of such colorant clusters

SUMMARY OF INVENTION

The present invention provides novel colorant clusters which can be used to impart desired coloration to compositions and coatings in which they are incorporated. Advantageously, the clusters provided herein exhibit the desirable property of sliding off the top or front surfaces of microspheres when a liquid coating containing the clusters and microspheres is applied to a substrate. The invention also provides liquid coating compositions that contain such clusters and are useful for forming retroreflective coatings. The invention further provides a method for forming such colorant clusters successfully and economically.

In brief summary, the colorant clusters or agglomerates of the invention each comprise an aggregation of a plurality of grains of sol-derived material, e.g., metal oxides, and colorant. Typically, the grains are adjoining to form a matrix. In a common embodiment, the colorant is in particle form and each cluster comprises a plurality of colorant particles being bonded together in the matrix or aggregation of a plurality of grains of sol-derived material.

Briefly summarizing, the method of the invention for manufacturing such clusters comprises
  a) providing a binder sol comprising a dispersion of colloidal particles, e.g., of one or more metal oxides, in a liquid;
  b) admixing colorant, e.g., in particle form, with the binder sol to yield a pigment sol; and
  c) removing the liquid;
to yield colorant clusters, each comprising an aggregation of a plurality of grains of sol-derived material and colorant.

Coating compositions of the invention comprise, in brief summary,
  a) retroreflective elements, e.g., microspheres with optional hemispheric reflective coatings thereon;
  b) coating vehicle, e.g., a film-forming liquid; and
  c) a plurality of colorant clusters, the colorant clusters comprising an aggregation of a plurality of grains of sol-derived material and colorant.

In common embodiments, coating compositions provided herein may be used as paints, i.e., used to provide retroreflective coatings on pavement, curbing, architectural locations, etc., or as inks, i.e., used to provide retroreflective coatings on fabrics, clothing, etc.

The colorant clusters provided herein offer advantages of relatively inexpensive cost of manufacture and good performance as they may be made in desired colors and readily slide off the tops or fronts of microspheres in drying retroreflective coatings. The low cost achieved herein is surprising because sols such as the silica sols which can be used herein are typically significantly more expensive than the sodium silicate raw material used to make clusters of the type disclosed in U.S. Pat. No. 3,251,704. However, because they can be made without use of the steps of acid neutralization and firing at elevated temperature (e.g., at temperatures on the order of about 360° C. to about 650° C. (680° F. to 1200° F.), which steps are disclosed in U.S. Pat. No. 3,251,704, colorant clusters of the invention may be made more cheaply than those in the patent. In addition, colorant clusters of the invention may be made with a wider variety of colorants than can the clusters disclosed in the patent. The ability to utilize other colorants facilitates specific formulation of clusters of desired color and also permits substitution for less desirable colorants. For instance, the present invention makes possible the avoidance of environmentally undesirable colorants, e.g., lead-based pigments, by permitting use of alternative colorants that were previously not suitable for use in colorant clusters because of degradation by acid neutralization and/or firing.

BRIEF DESCRIPTION OF DRAWING

The invention will be further explained with reference to the drawing, wherein:

An idealized figure, FIG. 1 is not to scale and is intended to be merely illustrative and non-limiting.

DETAILED DESCRIPTION OF PREFERRED EMBODIMENTS

Figure 1:
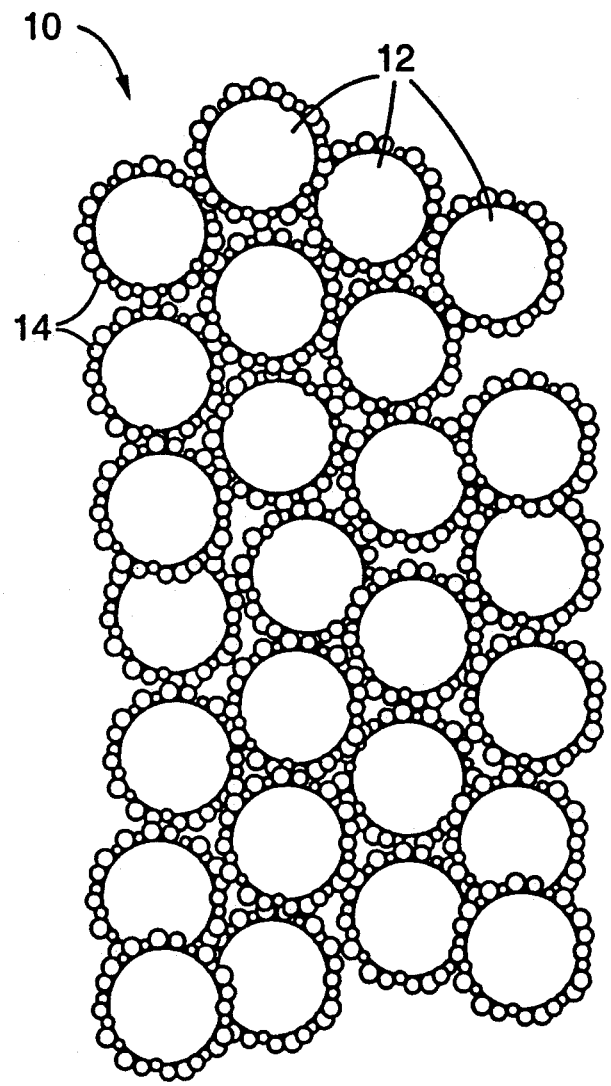
FIG. 1 is a schematic illustration of a portion of an illustrative colorant cluster of the invention.

FIG. 1 shows an illustrative colorant cluster of the invention. Cluster 10 comprises a plurality of colorant particles 12 bonded together with an aggregation of a plurality of grains 14 of sol-derived material. Although colorant particles 12 have been shown as being in spherical form and of uniform size for ease of illustration, they need not be spherical or of uniform size or shape.

As mentioned above, the process of the invention comprises:
  a) providing a sol (referred to herein as a "binder sol") comprising a suspension of colloidal particles, e.g., of one or more metal oxide(s), in a liquid;
  b) admixing colorant with the sol to yield what is referred to herein as a pigment sol; and
  c) removing the liquid from the pigment sol;
to yield the colorant clusters. "Metal oxide", as used herein, includes oxides of metalloids (e.g., silicon) in addition to oxides of metals (e.g., zirconium and aluminum). Typically, the colorant will be in the form of particles when mixed in the binder sol, the particles becoming dispersed throughout the sol just as the sol particles are. In such embodiments, the resultant clusters typically comprise a plurality of colorant particles bonded together in an aggregation of a plurality of grains of sol-derived material, i.e., the particles of the binder sol. In other embodiments, such as where the colorant is a dye which is soluble in the liquid medium of the sol, the colorant dissolves when mixed in the binder sol. In such embodiments, the resultant clusters typically comprise small deposits of colorant on the grains of sol-derived material rather than discrete colorant particles in the clusters.

Sols are dispersions in liquid medium of small discrete particles, typically from about 3 to about 100 nanometers ("nm") in diameter, at concentrations typically ranging from about 15 to about 50 percent by weight. Typically, the discrete particles are relatively free of aggregation. Substantial aggregation of the sol particles would be detected as a substantial rise in viscosity of the sol. Sols are also sometimes called colloidal suspensions.

It is believed that most known sols could be used as binder sols in the present invention. Aqueous sols, i.e., sols wherein the liquid medium is water, are preferred because they are typically cheaper than other sols and typically contain little or no volatile organic content, thereby obviating environmental concerns. Illustrative examples of aqueous sols useful herein include silica sols, zirconia sols, and titania sols. Many organosols, i.e., sols in which the liquid medium is an organic solvent rather than water, are believed suitable for use as binder sols herein, however, environmental concerns over the release of organic vapors may discourage their use.

Ralph K. Iler, *Chemistry of Silica, Solubility Preliminary, Colloid and Surface Properties, and Biochemistry* John Wylie & Sons, New York, 1979, reports that silica sols may be characterized by their chemical analysis, particle characteristics, and physical characteristics. For applications of the invention wherein the resultant colorant cluster is to be used outdoors or in conditions where it is likely to get wet, the sol used preferably exhibits the capacity to resist disassociation in water into a sol once dried or solidified by removal of liquid medium. It is believed that the colorant clusters made from such sols exhibit superior weatherability. A test for accelerated simulation of a long term weatherability test is described below. An illustrative example of a useful titanate sol which does not disassociate after solidification is NALCO TM 88SN-126 Colloidal Titanium Dioxide from Nalco Chemical Co. of Napersville, Ill. NYACOL TM A1530 Colloidal Antimony Oxide from Nyacol Products Inc. of Ashland, Mass., an antimony oxide sol which readily disassociates in water after solidification, is not desirable as a binder sol for use in outdoor applications. It does, however, exhibit fire retardant properties desirable in some applications.

Binder sols appropriate for use in this invention include those sols having an average particle size of less than about 360 nm (about the lower limit of the range of visible wave lengths of light) and preferably between about 5 and about 60 nm. Generally, as the size of sol particle in the binder sol decreases, the specific surface area of the resultant colorant cluster increases. If the average sol particle size is too large, the grains of sol-derived material in the resultant colorant clusters may tend to interfere with the appearance of the clusters. Binder sols with smaller sol particles tend to be more expensive. Preferably, the sol particles are substantially uniform in size to yield greater uniformity in cluster characteristics.

Each grain in a colorant cluster of the invention corresponds to a sol particle in the binder sol. Thus, the grains will typically have an average diameter up to about 100 nanometers and preferably between about 4 and about 60 nanometers. A common sol particle size is about 20 nanometers, such sols providing a useful combination of easy shipping and high concentration. Colorant clusters made with such binder sols will have grains having an average diameter of about 20 nanometers.

One particularly useful and preferred sol is an ammonia stabilized silica sol with about 40 weight percent silicon dioxide and a particle size of about 20 nm. This sol is preferred in part because the ammonia stabilizer may be readily removed by heating to moderate temperatures, e.g., typically about room temperature, whereas some stabilizers are more difficult to remove. Although useful for keeping a binder sol in desired suspension during preliminary steps, if left in the composition after formation of the pigment sol and removal of the liquid medium, stabilizers may interfere with cohesion of clusters. In addition, silica sols are typically substantially translucent, thereby improving the brilliance and brightness of color they exhibit, and they are typically readily available for relatively low cost. An example of a commercially available ammonia-stabilized silica sol is NALCO TM 2327, from the Nalco Chemical Company. According to Table 4.3 of Iler, NALCO TM 2327, formerly known as NALCOAG TM 2327, contains about 40 weight percent silicon dioxide and about 0.1 weight percent ammonia in water. It has a pH of about 9.3, an average particle diameter of about 20 nm, and a specific surface area of about 150 meter$^2$/gram ("m$^2$/g"). Another useful sol from the same source is NALCO TM 1060 which contains about 50 weight percent silicon dioxide, is stabilized with about 0.25 weight percent sodium monoxide, has a pH of about 8.5, an average particle size of about 60 nm, and a specific surface area of about 50 m$^2$/g. Other sources of appropriate silica sols useful as binder sols herein are E. I. DuPont de Nemours & Company ("DuPont"), which sells sols under the trademark LUDOXT TM; Nyacol, Inc. of Ashland, Mass., which sells sols under the trademark NYACOL TM; Nissan Chemical Industries Ltd. with offices in New York which sells sols under the trademark SNOWTEX TM; and Monsanto, Ltd., which sells sols under the trademark SYTON TM.

If desired, a mixture of sols may be used as a binder sol herein

"Colorant" is used herein to mean a material which selectively absorbs certain wavelengths of visible light and either reflects or transmits other wavelengths to produce a desired colored appearance. Colorants used herein may be organic or inorganic in character, and may be soluble or insoluble in water or organic solvents. Illustrative examples of inorganic pigment particles suitable for use as colorants herein include titanium dioxide (white), carbon black (black), and chrome oxide (green) such as G-112 from Harcros Chemical of Corpus Christi, Tex., and lead chromate (yellow). Illustrative examples of organic pigments and dyes suitable for use as colorants in herein include copper phthalocyanine (especially when supplied as a colloidal suspension such as that available as PONOLITHT TM Blue from MOBAY Corp.) (blue), quinacridone (red), MONASTRAL TM Red Y-759-D (red) and CROMOPHTAL TM Violet B (violet), both available from Ciba Geigy Pigments Company. The DALAMAR TM series of monoazo yellow pigments from Cookson Pigments Company can be used instead of lead chromate to avoid use of lead-based materials in the colorant clusters.

Selection of a suitable colorant or colorants for a particular application is dependent in part upon the color desired of the resultant coating It is also dependent in part upon the ambient conditions to which the coating will be subjected, e.g., a colorant for use in outdoor applications is typically preferably resistant to degradation by exposure to ultraviolet radiation, at least within the intended lifetime of the resultant coating. Also, for outdoor applications, the colorant is preferably not soluble in water.

In common embodiments the colorant particles will be submicron in size, e.g., typically between about 0.1 and about 0.5 microns, but colorant particles of other sizes, e.g., about 1 to about 2 microns, may be used if desired. Typically, the colorant particles will be larger than the size of the sol particles. If the colorant particles are too large, the binder sol may be ineffective in binding the colorant particles together so as to yield useful clusters.

Titanium dioxide is typically preferred as a colorant for use in liquid coating compositions such as are applied to pavement surfaces. This preference is due in part to the bright white appearance it imparts and its typically low cost. Illustrative examples of commercially available titanium dioxide pigments include TIPURE TM R-960, from DuPont, and RCL-9, from SCM Chemicals of Baltimore, Md.

Inks such as are applied to fabrics and clothing, are formulated in a variety of colors. One common color is black or dark grey. Carbon black is a preferred colorant for such ink compositions. An illustrative example of a suitable carbon black is RAVEN TM 1255, from Columbian Chemicals of Atlanta, Ga.

Typically, in order for the resultant colorant clusters to provide desired coloration, the pigment sol comprises between about 2 parts by weight of colorant per 98 parts by weight of sol particles and about 60 parts by weight of colorant per about 40 parts by weight of sol particles. If too little sol is used, the clusters may tend to break up, becoming so small that they interfere with the desired clearing action of the microspheres when an applied coating is drying. If too much sol is used, the resultant clusters and coatings containing same may not exhibit the desired brilliance of color. Preferably, when nonsoluble colorants are used the pigment sol comprises a substantially continuous phase of sol particles in which the colorant particles are dispersed as a discontinuous phase.

Admixing colorant into binder sol to yield pigment sol may be accomplished by simple hand stirring for small batches or for preparation of larger batches by employing a typical industrial mixer such as a Lightning mixer. In some cases, it may be necessary to add water (in the case of aqueous sols) to reduce the viscosity and facilitate mixing and subsequent handling of the pigment sol. In some instances depending upon the particular sol being used, it is useful to maintain a suitable pH and/or low enough concentration that gellation of the sol is avoided. Also, if the pigmet sol is separated into drops as part of the liquid removal, the amount of sol particles and colorant within a single drop determines the size of resultant colorant clusters. Control of the concentration of the pigment sol thereby provides a means for controlling colorant cluster size. Optimum mixing conditions and concentrations may be readily determined by trial and error.

In an illustrative embodiment, white substantially spherical agglomerations of pigment particles are produced from a pigment sol made by mixing six parts by weight of titanium dioxide (DuPont's TIPURE TM R-690) with 10 parts of NALCOI TM 2327. In another illustrative embodiment, white substantially spherical colorant clusters are produced from a pigment sol made by mixing 750 pounds (295 kilograms ("kg")) of titanium dioxide (RCL-9 TiO$_2$ from SCM Chemicals) with 110 gallons (416 liters) of silica sol (NALCO TM 2327) and 115 gallons (436 liters) of water. In another illustrative embodiment, 25 parts by weight of carbon black (e.g., N-550, a furnace grade carbon black) is mixed with 187.5 parts by weight of silica sol (NALC TM 2327) to yield a pigment sol. In another illustrative embodiment, black substantially spherical colorant clusters are produced from a pigment sol made by mixing 150 pounds (68 kg) of carbon black (RAVEN TM 1255 from Columbian Chemicals Company) with 110 gallons (4–16 liters) of silica sol (NALCO TM 2327) and 110 gallons (416 liters) of water.

After mixing, the pigment sol (i.e., dispersion or solution of colorant in binder sol) is processed into small, dry colorant clusters. One method to accomplish this step is to first dry the pigment sol, for example, overnight in an oven, then to break up or communite, e.g., by ball mill, the hardened mass into small pieces or clusters of desired size. Such an approach is believed most useful for small test batches.

A more preferred method of producing colorant clusters or agglomerate particles from pigment sol in larger quantities is to spray dry the pigment sol. In the spray dying method, the pigment sol is first sprayed from a rotating wheel to create a fine mist of droplets of the wet pigment sol. A flow of warm dry air rapidly dries the liquid, e.g., water from the droplets, yielding solidified colorant clusters. This method is believed to make optimum use of the cost advantages provided by the present invention. The size of the resultant clusters is dependent in part upon the size of the droplets and, as mentioned above, the concentration of sol particles and colorant in the pigment sol. It has been observed that faster drying tends to result in clusters which are less dense than are clusters formed from drops of the same pigment sol which are dried more slowly.

Suitable spray driers are available from Crepaco Spray Drier (formerly Anhydro Spray Drier) of Attleboro Falls, Mass. Other spray dryers, such as a 7.5 foot $\times$ 7.5 foot (2.28 $\times$ 2.28 meters) spray drier, equipped with a F-10 rotary atomizer, all of which is available from NIRO Atomizer of Colombia, Md., are also effective in making colorant clusters in accordance with the invention. Specifically, when operated at a wheel speed of 22,000 rpm, an inlet air temperature of 650° F. (343° C.), and pumping the pigment sol at a rate which maintains an outlet air temperature of 220° to 250° F. (104° to 121° C.), spray drying sufficient to rapidly dry the droplets of the mist before they coalesce into larger droplets is accomplished. About 70 percent by weight of the resultant clusters would pass through a 325 mesh screen. Spray drying is a well known process and the above discussion is adequate for practice by one of ordinary skill in this art. Additional detail is available in the book *Spray Drying* by K. Masters, John Wiley and Sons, New York.

Colorant clusters of the invention may be made in a wide range of desired sizes, but will typically have an average diameter of up to about 200 microns. In many embodiments, the average diameter of the clusters will be between about 20 and about 75 microns.

Preferably, the colorant clusters produced in accordance with the invention are also subjected to a particle size discrimination step. Screening is a preferred particle size discrimination step. For instance, in the case of a liquid coating composition containing microspheres having an average diameter of about 60 to 75 microns, the colorant clusters preferably pass through a 325 mesh screen in order to efficiently slide off the tops or fronts of the exposed microspheres. If larger microspheres are used, larger colorant clusters may be used and still provide the desired tendency to slide off the tops or fronts of the microspheres.

The durability and weatherability (or weather resistance) of colorant clusters of the invention can be assessed by placing a 5 gram ("g") sample of colorant clusters in 100 milliliters ("ml") of water in a 250 ml beaker. The beaker with water and sample is then placed in an ultrasonic bath, such as a BRANSONT TM Model 5200 (available from Branson Cleaning Equipment Co. of Shelton, Conn.), and subjected to ultrasonic agitation for 30 minutes. Acceptable colorant clusters do not appear to fragment or disassociate during ultrasonic agitation and settle quickly (as does the sample prior to agitation) when the ultrasonic agitation is terminated. In addition to evaluating colorant clusters, this test method may be used to evaluate the suitability of binder sols for use in making clusters of the invention.

A characteristic difference distinguishing colorant clusters of the present invention from those of U.S. Pat. No. 3,251,704 is the substantially greater specific surface area typically exhibited by the new clusters. Colorant clusters of the present invention are typically characterized by specific surface areas of at least about 40 $m^2/g$, sometimes at least about 65 $;m^2/g$, and in some embodiments at least about 300 $m^2/g$. The specific surface areas of agglomerates can be assessed by the B.E.T. nitrogen technique using a QUANTASORB TM apparatus (available from Quantachrome Corporation of Syosset, N.Y.). This well known method provides a measure of the specific surface area of an article, e.g., colorant clusters, by measuring the amount of nitrogen which condenses and freezes on the surface of the article in a defined coating thickness. Additional information may be obtained by reference to the book *Powder Surface Area and Porosity* by S. Lowell and J. Shields, Chapman and Hall, New York. The specific surface areas of the prior art clusters typically range from about 1.2 $m^2/g$ for clusters containing titanium dioxide, to about 2.5 $m^2/g$ for clusters containing lead chromate, to about 26 $;m^2/g$ for clusters containing carbon black. By comparison, the corresponding colorant clusters of the present invention have specific surface areas of about 65 $m^2/g$, 85 $m^2/g$, and 150 $m^2/g$ respectively.

When clusters of the invention, formed from silica binder sol and titanium dioxide colorant particles, are observed by transmission electron microscopy ("TEM") at magnifications on the order of about 100,000X, the colorant clusters are seen to comprise a plurality of colorant particles bonded together with an aggregation of a plurality of adjoining grains of sol-derived material. These adjoining grains appear as small granular areas. Larger and denser regions which correspond to opaque pigment particles, specifically, titanium dioxide colorant particles are also visible. By way of comparison, the clusters of U.S. Pat. No. 3,251,704 were observed to have amorphous binder portions, lacking the granular appearance of the aforementioned adjoining grains.

The present invention involves novel colorant clusters which may be readily substituted for the pigment clusters disclosed in the aforementioned U.S. Pat. No. 3,251,704. Typically substantially spherical if made by spray drying or comminuted via ball milling, colorant clusters of the invention demonstrate comparable tendencies to slide off the tops or fronts of microspheres in drying liquid coatings. Also, colorant clusters of the invention may be made from colorants which could not be used in the colorant clusters disclosed in U.S. Pat. No. 3,251,704. In some instances, colorant clusters of the invention exhibit superior durability and weatherability as compared to the clusters disclosed in that patent. By eliminating the need for acid neutralization and firing at elevated temperatures, the process of the invention and colorant clusters produced thereby offer reduced costs as compared to U.S. Pat. No. 3,251,704.

Colorant clusters of the invention may be incorporated in a variety of liquid coating compositions used to form retroreflective coatings on substrates. When used on pavement, architectural locations, signs, etc. such compositions are commonly referred to as paints. When used on fabrics such as clothing and banners, e.g., to screen print decorative images, such compositions are commonly referred to as inks. In general, however, liquid coating compositions of the invention typically comprise:

a) retroreflective elements;
b) coating vehicle; and
c) colorant clusters as described herein.

The relative proportion of these components is dependent in part upon the conditions under which the composition is to be applied, the techniques to be used to do so, the characteristics of the substrate to which it is to be applied, and the characteristics desired of the resultant coating.

A well known and commonly used form of retroreflective elements are microspheres, typically glass, with reflective layers thereon. Typically, microspheres have an index of refraction between about 1.5 and about 2.2, with about 1.95 being preferred for bright retroreflection of visible light under dry conditions. Glass microspheres are typically quite durable. Microspheres used in coating compositions typically have an average diameter between about 25 and about 200 microns. It will be understood, however, that microspheres having diameters outside this range may be used if desired. The reflective layers typically cover about half of the microsphere. Many reflective layers are well known and may be used in compositions of the invention. Illustrative examples of suitable reflective layers include aluminum, silver, and dielectric layers. In some instances, metal, e.g., aluminum, or nacreous flakes may be incorporated in the vehicle.

The coating vehicle typically comprises a film forming resin which acts as binder for the resultant retroreflective coating. Selection of vehicle for a particular application is dependent in part upon the substrate to which the liquid coating composition is to be applied, the ambient conditions to which the resultant coating will be subjected and is expected to endure during use, speed at which the coating is desired to dry, desired flexibility and toughness of the resultant retroreflective coatings, etc. The coating vehicle may further comprise volatilizing agents to speed drying.

If desired, a number of additives may be incorporated in the liquid coating composition. For example, one or more of the following may be used: thickener, pH control agent, foam control agent, antimicrobial agent, coupling agent, drying agent, antiskin agent, solvating agent, etc.

In order to achieve optimum clearing of the fronts and tops of the retroreflective elements when the coating is drying, the average diameter of the colorant clusters should be less than the average diameter of the retroreflective elements. Typically, it is preferred to use a combination of colorant clusters containing clusters which are near the size of the microspheres (i.e., within about 15 percent thereof) and clusters which are substantially smaller (i.e., less than about 25 percent of the size of the microspheres). In such combinations, the larger clusters facilitate clearing off the microspheres and the smaller clusters pack more closely about the microspheres, providing better hiding power and imparting a more uniform color to the resultant retroreflective coating. In illustrative embodiments, ratios by weight of larger to smaller clusters from about 10:1 to about 1:20 would typically be useful. It will be understood that ratios outside this range might be used if desired.

Colorant clusters which are relatively acicular in shape typically do not slide off the fronts of microspheres (when liquid coating compositions containing those members are allowed to dry) as well as colorant clusters which are not substantially longer in one dimension than another do. For instance, relatively cubic colorant clusters would work well, with substantially spherical colorant clusters being more preferred.

In many embodiments, a liquid coating composition of the invention to be used as a paint will comprise:

a) between about 20 and about 50 weight percent of retroreflective elements, typically preferably glass microspheres with aluminum reflective layers thereon;
b) between about 20 and about 60 weight percent of vehicle, i.e., paint vehicle;
c) up to about 2 weight percent paint drier; and
d) between about 15 and about 45 weight percent of colorant clusters as provided herein.

In many embodiments, a liquid coating composition of the invention to be used as an ink will comprise:

a) between about 25 and about 50 weight percent of retroreflective elements, typically preferably microspheres with dielectric coatings thereon;
b) between about 40 and about 65 weight percent of vehicle, i.e., ink vehicle;
c) between about 5 and about 20 weight percent of colorant clusters as provided herein.

The effectiveness of the colorant clusters as general colorants in premixed retroreflective paint may be assessed by comparing the hiding power and retroreflectivity of coatings formed on 0.025 inch thick (0.64 millimeter) aluminum panels, having a surface about 2.75 inches by about 11 inches (7 centimeters ("cm")×28 cm). Reproducible application of paint samples to be compared is made to the panels with a manual coating by a #30 wire bar coater (available from R.D.S. of Webster, N.Y.). Alternative forms of bar coating, gravure coating, etc. may be used if desired. After coating, the painted panel is allowed to dry overnight. Visual comparison relative to paints such as that disclosed in Example 1 of U.S. Pat. No. 3,251,704 (Nellessen), the entire disclosure of which is incorporated herein by reference, are then made as are measurements of retroreflectivity. Coatings of the invention, made from liquid coating compositions containing equivalent proportions of reflective elements, coating vehicle, and colorant clusters as coatings containing previously available colorant clusters instead of colorant clusters of the invention, provided substantially equivalent hiding power and retroreflective brightness.

EXAMPLES

The invention will be further explained by the following illustrative examples which are intended to be nonlimiting. Unless otherwise indicated, all amounts are expressed in parts by weight.

EXAMPLE 1

White colorant clusters were produced by mixing:

| Amount | Component |
|---|---|
| 750 pounds (340 kg) | titanium dioxide - RCL-9 ™ from SCM Chemicals, |

| Amount | Component |
|---|---|
| 110 gallons (416 liters) | silica sol - NALCO ™ 2327, and |
| 115 gallons (436 liters) | water. |

The additional water thinned the pigment sol, thereby facilitating easier mixing and subsequent spray drying. The pigment sol was spray dried in an ANHYDROT ™ Spray Drier (from Anhydro Spray Drier Company of Attleboro Falls, Mass.) to yield colorant clusters. The clusters were classified to eliminate pieces incapable of passing through a through a 325 mesh screen (which corresponds to an opening of 44 micrometers). The product had a specific surface area of 65 $m^2/g$.

The resultant white colorant clusters were examined under via transmission electron microscopy ("TEM") at a magnification of 100,000×. A comparison photomicrograph at the same magnification of the prior art product resulting from the process described in U.S. Pat. No. 3,251,704. The titanium dioxide colorant particles were visible in both photomicrographs as large dark or opaque portions. The grains of sol-derived material in clusters of the invention were observed as small grainy, substantially spherical, gray portions adjoining the colorant particles. The particles of silicon dioxide appeared to correspond to the original particles of the silica sol. The prior art product was observed to have large, amorphous, areas of uniform gray material binding the titanium dioxide particles.

A white retroreflective paint was prepared using the white colorant clusters of example 1. The paint comprised:

| Amount | Component |
|---|---|
| 36.9 | paint vehicle, |
| 38.6 | glass microspheres (average diameter 45 microns, ±15 microns) with aluminum reflective layers, |
| 24.1 | colorant clusters and |
| 0.4 | drier. |

The paint vehicle contained:

| Amount | Component |
|---|---|
| 55.85 | thickening agent - THIXAMAC ™ 6040, alkyd resin from McWorter, |
| 20.07 | solvating agent - ISOPAR E, hydrotreated heavy naptha from Exxon, |
| 13.70 | solvating agent - ISOPAR L, hydrotreated heavy naptha from Exxon, |
| 10.08 | solvating agent - AMSOL 1435, aromatic hydrocarbon mixture from Unocal, and |
| 0.29 | antiskin agent - methyl ethyl ketoxime. |

The paint drier contained:

| Amount | Component |
|---|---|
| 33.5 | mineral spirits, |
| 27.8 | drying agent - cobalt naphthenate (from Akzo Chemicals), |
| 23.8 | drying agent - lead naphthenate (from Akzo Chemicals), and |
| 14.9 | drying agent-manganese naphthenate (from Akzo Chemicals). |

The paint was white in appearance, demonstrated good coverage and was immediately retroreflective upon drying.

EXAMPLE 2

Black colorant clusters were prepared by mixing 18.75 parts of silica sol (NALCO ™ 2327) with 2.5 parts of carbon black (RAVEN ™ 1255). Additional water was added to prevent gelation and improve handling. The pigment sol was then spray dried and resultant clusters classified by passage through a 325 mesh screen to yield black substantially spherical agglomerates. The product had a specific surface area of 150 $m^2/g$.

The resultant colorant clusters were then used to make a retroreflective ink suitable for printing T-shirts. The ink vehicle contained:

| Amount | Component |
|---|---|
| 2750 | water, |
| 37.6 | thickener - CARBOPOL ™ 940 (from B. F. Goodrich of Cleveland, Ohio), |
| 9.2 | pH control - ammonium nitrate, |
| 18.0 | antifoamant - FOAMASTER ™ DF-160-L (from Henkel Process Chemicals of Ambler, Pennsylvania), |
| 1748.0 | latex resin - RHOPLEX ™ HA-8 (Rohm and Haas), and |
| 50.0 | antimicrobial agent - AMICAL ™ Flowable ABG-8001 (Abbott Labs, North Chicago, Illinois), | adjusted to about pH 7.0 with ammonium hydroxide. The ink contained:

| Amount | Component |
|---|---|
| 86. | ink vehicle, |
| 14. | black colorant clusters, |
| 50. | reflectorized glass beads, and |
| 1.3 | silane coupling agent - Z6040 (from Dow Corning of Midland, Michigan). |

T-shirts were printed with the black ink described above, and for comparison, T-shirts were also printed with 3M Brand No. 8010 Reflective Ink, a commercially available black retroreflective ink from the Minnesota Mining and Manufacturing Co. ("3M") of St. Paul, Minn.), by silk screening. The 8010 ink contained colorant clusters of the type disclosed in U.S. Pat. No. 3,251,704. The coatings provided with ink of the invention and with the 8010 ink both demonstrated initial retroreflection and good opacity. The T-shirts were washed in a standard washing cycle 25 times and both coatings were found to have maintained good retroreflectivity and opacity.

A black retroreflective paint was prepared using the same colorant clusters. The paint contained:

| Amount | Component |
|---|---|
| 50.5 | paint vehicle (as in Example 1), |
| 30.1 | glass microspheres (as in Example 1), |
| 18.9 | colorant clusters, and |

| Amount | Component |
|---|---|
| 0.5 | drier (as in Example 1). |

The paint was black in appearance, demonstrated good coverage and was immediately retroreflective upon drying.

EXAMPLE 3

Violet colorant clusters were prepared by mixing 50 grams ("g") of CROMOPHTAL TM Violet B with 1000 g of NALCO TM 2327 (ammonia stabilized silica sol with 40 weight percent silica dioxide) and 300 g of water. The pigment sol was spray dried and the resultant clusters passed through a 325 mesh screen. The final product contained 88.8 weight percent silica and 11.2 weight percent colorant and was acceptable as violet colorant clusters. The colorant clusters exhibited aesthetically appealing daytime color and did not disassociate in water.

Example 4

Green colorant clusters were prepared by mixing 80 g of chrome oxide (G-112 from Harcross Chemical, Corpus Christi, Tex.) with 1000 g of NALC0 TM 2327 and 1000 g of water. The pigment sol was spray dried and the resultant clusters passed through a 325 mesh screen. The final product contained 83 weight percent silica and 17 weight percent colorant and was acceptable as green colorant clusters. The clusters had a specific surface area of 99 $m^2/g$ and did not disassociate in water.

Example 5

Blue colorant clusters were prepared by mixing 27 g of copper phthalocyanine (PONOLITH TM Blue from Mobay Corp) with 1000 g of NALCO TM 2327 and 1000 g of water. The pigment sol was spray dried and the resultant clusters passed through a 325 mesh screen. The final product contained 93.7 weight percent silica and 6.3 weight percent colorant and was acceptable as blue colorant clusters. The clusters had a specific surface area of 107 $m^2/g$ and did not disassociate in water.

Example 6

Red colorant clusters were prepared mixing 10 g of MONASTRAL TM Red Y-759-D with 1000 g of NALCO TM 2327 and 300 g of water. The pigment sol was spray dried and the resultant clusters passed through a 325 mesh screen. The final product contained 97.6 weight percent silica and 2.4 weight percent colorant and was acceptable as red colorant clusters. The clusters did not disassociate in water.

Example 7

A pigment sol was prepared by mixing 6 parts of DuPont TIPURE TM R-960 to 10 parts of NALCO TM 2327. The pigment sol was spray dried and resultant colorant clusters screened through a 325 mesh screen to produce white colorant clusters each having diameter less than 44 microns. The clusters did not disassociate in water.

Example 8

Blue colorant clusters were prepared by mixing 35.3 g of titania sol (NALCO TM 88SN-126 Colloidal Titanium Dioxide from Nalco Chemical Company) with 0.27 g of a blue colorant, copper phthalocyanine (PHONOLITH TM Blue RDC Liquid from Mobay Corp.). The pigment sol was then solidified by adding 4.0 g of weight percent ammonium acetate solution in water. The material was dried at 90° C. overnight, then crushed to fine particles with a mortar and pestle. Two grams of the resulting colorant clusters were mixed with 98 g of water. The blue colorant clusters did not disassociate in water after standing for over 1 hour or after 30 minutes of ultrasonic agitation.

Example 9

A pigment sol was prepared by mixing 133 g of antimony oxide sol (NYACOL TM A1530 Colloidal Antimony Oxide from Nyacol Products Inc. of Ashland, Mass.) with 2.7 g of copper phthalocyanine, PONOLITH TM Blue RDC Liquid from Mobay Corp. The material was dried at 70° C. overnight to yield a hardened mass, then milled in a ball mill. Two grams of the resulting clusters were mixed with 98 g of water. The clusters disassociated in the water in less than 1 hour.

Various modifications and alterations of this invention will become apparent to those skilled in the art without departing from the scope and spirit of this invention.

What is claimed is:

1. Colorant clusters, each comprising an aggregation of a plurality of grains of sol-derived material and colorant, wherein the average diameter of said clusters is up to about 200 microns and said grains have an average diameter of about 360 nanometers or less.

2. The clusters of claim 1 wherein said aggregation comprises one or more metal oxides.

3. The clusters of claim 1 wherein said clusters have a specific surface area of at least about 40 $m^2/g$.

4. The clusters of claim 1 wherein said clusters have a specific surface area of at least about 65 $m^2/g$.

5. The clusters of claim 1 wherein said clusters have a specific surface area of at least about 300 $m^2/g$.

6. The clusters of claim 1 wherein said grains have an average diameter of about 100 nanometers or less.

7. The clusters of claim 1 wherein said grains have an average diameter between about 4 and about 60 nanometers.

8. The clusters of claim 1 wherein said grains have an average diameter of about 20 nanometers.

9. The clusters of claim 1 wherein said grains are derived from one or more of the following aqueous sols: silica sol, titania sol, and zirconia sol.

10. The clusters of claim 1 wherein said grains are derived from an ammonia-stabilized silica sol having sol particles having an average diameter of up to about 100 nanometers.

11. The clusters of claim 1 wherein the average diameter of said clusters is between about 20 and about 75 microns.

12. The clusters of claim 1 wherein said clusters comprise a plurality of colorant particles bonded together with said aggregation of a plurality of grains of sol-derived material.

13. The clusters of claim 1 wherein said colorant comprises one or more pigments or dyes.

14. The clusters of claim 1 wherein said colorant comprises one or more of the following inorganic pigments: titanium dioxide, carbon black, chrome oxide, and lead chromate.

15. The clusters of claim 1 wherein said colorant comprises at least one of quinacridone and copper phthalocyanine.

16. The clusters of claim 1 wherein said colorant comprises monoazo pigments or dyes.

17. The clusters of claim 1 wherein 5 grams of said clusters do not disassociate in 100 milliliters of water during ultrasonic agitation for 30 minutes in a BRANSON ™ Model 5200 ultrasonic bath.

18. A coating composition for providing retroreflective coatings, said composition comprising:
   a) retroreflective elements;
   b) a coating vehicle; and
   c) a plurality of colorant clusters, said colorant clusters each comprising an aggregation of a plurality of grains of sol-derived material and colorant, wherein the average diameter of said clusters is up to about 200 microns and said grains have an average diameter of about 360 nanometers or less.

19. The coating composition of claim 18 wherein said composition comprises:
   a) between about 20 and 50 weight percent of glass microspheres;
   b) between about 20 and about 60 weight percent paint vehicle;
   c) between about 0 and about 2 weight percent paint drier; and
   d) between about 15 and about 45 weight percent of said colorant clusters.

20. The coating composition of claim 18 wherein the average diameter of said clusters is less than the average diameter of said reflective elements.

21. The coating composition of claim 18 wherein said composition comprises colorant clusters which are nearly as large as the average size of said retroreflective elements and colorant clusters which are substantially smaller than the average size of said retroreflective elements.

22. The coating composition of claim 18 wherein said composition comprises:
   a) between about 25 and about 50 weight percent of glass microspheres;
   b) between about 40 and about 65 weight percent ink vehicle; and
   c) between about 5 and about 20 weight percent of said colorant clusters.

23. A process for manufacturing colorant clusters comprising:
   a) providing a binder sol comprising a suspension of colloidal particles in a liquid medium, wherein the colloidal particles have an average diameter of about 360 nonometers or less;
   b) admixing colorant with said binder sol to yield a pigment sol; and
   c) removing said liquid;
   to yield colorant clusters which each comprise an aggregation of a plurality of grains of sol-derived material and colorant, wherein the average diameter of said clusters is up to about 200 microns.

24. The process of claim 23 wherein droplets are derived from said pigment sol and said liquid medium is then removed from said droplets to yield said colorant clusters.

25. The process of claim 24 wherein said liquid medium is removed via spray drying.

26. The process of claim 23 wherein said liquid medium is removed from said pigment sol to yield a hardened mass and said hardened mass is communited to yield said colorant clusters.

27. The process of claim 26 wherein said hardened mass is communited via ball milling.

28. The process of claim 23 wherein said binder sol in an aqueous silica sol.

29. The process of claim 28 wherein said binder sol is stabilized with ammonia and comprises sol particles having an average diameter of about 20 nanometers.

30. The process of claim 23 wherein said binder sol comprises one or more of the following: silica sol, titania sol, and zirconia sol.

31. The process of claim 23 wherein the sol particles of said binder sol have an average diameter of about 100 nanometers or less.

32. The process of claim 23 wherein said sol particles have an average diameter of between about 4 and about 60 nanometers.

33. The process of claim 23 wherein said sol particles have an average diameter of between about 20 nanometers.

34. The process of claim 23 wherein said colorant comprises one or more pigments or dyes.

35. The process of claim 23 wherein said colorant comprises one or more of the following inorganic pigments: titanium dioxide, carbon black, chrome oxide, and lead chromate.

36. The process of claim 23 wherein said colorant comprises copper phthalocyanine.

37. The process of claim 23 wherein said colorant comprises monoazo pigments or dyes.

38. The process of claim 23 wherein said colorant cluster comprises between about 2 and about 60 weight percent of said colorant and between about 98 and about 40 weight percent of said grains.

39. The product of the process of claim 23.

40. The product of claim 39 wherein 5 grams of said clusters resist disassociation in 100 milliliters of water for at least 30 minutes while being ultrasonically agitated in a BRANSON ™ Model 5200 ultrasonic bath.

* * * * *

UNITED STATES PATENT AND TRADEMARK OFFICE
CERTIFICATE OF CORRECTION

PATENT NO. : 5,269,840

DATED : December 14, 1993

INVENTOR(S) : Geoffrey P. Morris et al.

It is certified that error appears in the above-identified patent and that said Letters Patent is hereby corrected as shown below:

In Col. 1, Line 34, the number "2,574,97" should read --2,574,971--.

In Col. 5, Line 20, "LUDOXT$^{TM}$" should read --LUDOX$^{TM}$--.

In Col. 5, Line 42, "PONOLITHT$^{TM}$" should read --PONOLITH$^{TM}$--.

In Col. 6, Line 52, "NALCOI$^{TM}$" should read --NALCO$^{TM}$--.

In Col. 6, Line 61, "NALC$^{TM}$" should read --NALCO$^{TM}$--.

In Col. 6, Line 67, "(4-16 liters)" should read --(416 liters)--.

In Col. 7, Line 67, "BRANSONT$^{TM}$" should read --BRANSON$^{TM}$--.

In Col. 8, Line 15, delete the semicolon after the number "65".

In Col. 8, Line 31, delete the semicolon after the number "26".

In Col. 11, Line 12, "ANHYDROT$^{TM}$" should read --ANHYDRO$^{TM}$--.

In Col. 14, Line 4, insert the number --1-- between the words "of" and "weight".

In Col. 16, Line 18, the last word "in" should read --is--.

Signed and Sealed this

Fourteenth Day of June, 1994

Attest:

BRUCE LEHMAN

*Attesting Officer*    Commissioner of Patents and Trademarks